United States Patent [19]

Toncelli

[11] 4,204,820
[45] May 27, 1980

[54] SLAB FORMING CONVEYING LINE

[76] Inventor: Marcello Toncelli, Via Giovanni XXIII, 2 - Bassano del Grappa (Vicenza), Italy

[21] Appl. No.: 873,144

[22] Filed: Jan. 30, 1978

[30] Foreign Application Priority Data

Apr. 22, 1977 [IT] Italy .................. 85564 A/77

[51] Int. Cl.² ............................................. B28B 3/02
[52] U.S. Cl. ........................................ 425/89; 425/420; 425/421
[58] Field of Search .................. 264/71, 102; 425/89, 425/420, 421

[56] References Cited

U.S. PATENT DOCUMENTS

| | | | |
|---|---|---|---|
| 1,814,172 | 7/1931 | Martinet | 425/89 |
| 3,103,698 | 9/1963 | Wollett | 425/420 |
| 3,372,217 | 3/1968 | Paerels et al. | 425/89 |
| 3,712,785 | 1/1973 | Hirt et al. | 425/421 |

Primary Examiner—John McQuade
Attorney, Agent, or Firm—Bucknam and Archer

[57] ABSTRACT

A method for the formation of resin-bonded grit slabs is described, in which a mixture containing inert minerals, and liquid resin in the minimum quantity necessary to bind the inert materials together, in order to avoid any excess of binder and thus to reduce the coefficient of thermal expansion of the finished product to levels compatible with its use, is subjected to combined pressure and vibration, in an airless environment, to obtain porosity-free slabs. The apparatus comprises a conveyor belt for automatically transferring the material, consisting of grit and resin mix in the quantity provided by a dispenser and held between two continuous sheets of cardboard under a vacuum vibratory press in which a slab is formed, and means for transporting the formed material into a drying oven in which the process is completed, with rapid polymerization of the resins, to produce grey slabs.

6 Claims, 4 Drawing Figures

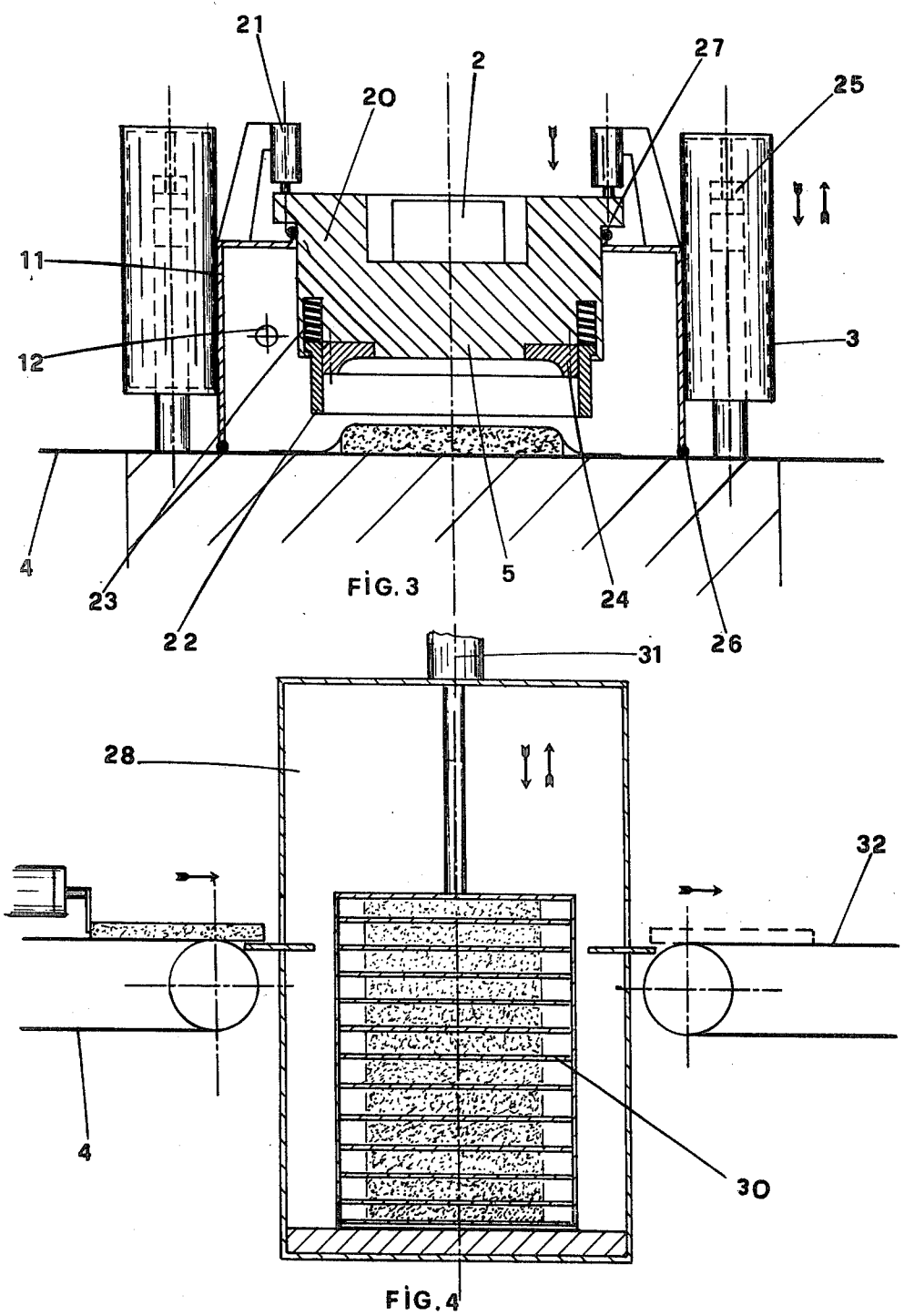

SLAB FORMING CONVEYING LINE

According to the invention, resin-bonded grit slabs are produced wherein the resins are incorporated in the quantity strictly necessary to bond the inert materials, also obtaining products free from porosity, homogeneous and endowed with dimensional stability.

Up to now, grit slabs bonded with resin in the liquid state have been produced by casting and vibration and/or pressing of fluid mixes whose fluidity is obtained by means of a high resin/inert materials ratio.

According to the invention, the resin/inert materials ratio is distinctly lower than that used up to now, so that the liquid resin is distributed in the mixture to form a coating which surrounds each particle of inert material, only in sufficient quantity to cause the granules of inert material to cohere when the slabs have been formed.

The combined vibration and pressure action in an airless environment makes it possible to obtain a finished product consisting of porosity-free slabs.

The use of dyes or differently coloured inert materials or mixtures and combinations thereof, makes it possible to obtain evenly or intermittently coloured or unevenly patterned slabs.

The scope of the present invention provides for the embodiment of apparatus suitable to carry out a continuous work cycle for producing the above-mentioned slabs, in order to automate the entire process of measuring out the product into the individual moulds, obtaining uniform distribution of the same and effecting pressing with vibration under vacuum, and the subsequent drying of the slabs in a drying oven, in which polymerisation of the resin is quickly completed.

According to a further characteristic of the invention, instead of the moulds containing the mix, two sheets of sufficiently strong and impermeable cardboard are arranged, between which the measured-out quantities of mix are positioned and transported under the press, preventing the mix from adhering to the conveyor belt and to the head of the press itself.

The above-mentioned apparatus is illustrated in the accompanying drawing, wherein:

FIG. 3 shows a detail of the press, on an enlarged scale.

FIG. 4 is a diagrammatic view of a detail of the drying oven.

FIGS. 1 and 2 show press 1, which compresses the mass of grit and resin mix intended to form a slab, under vacuum and with vibration.

Figure 1:
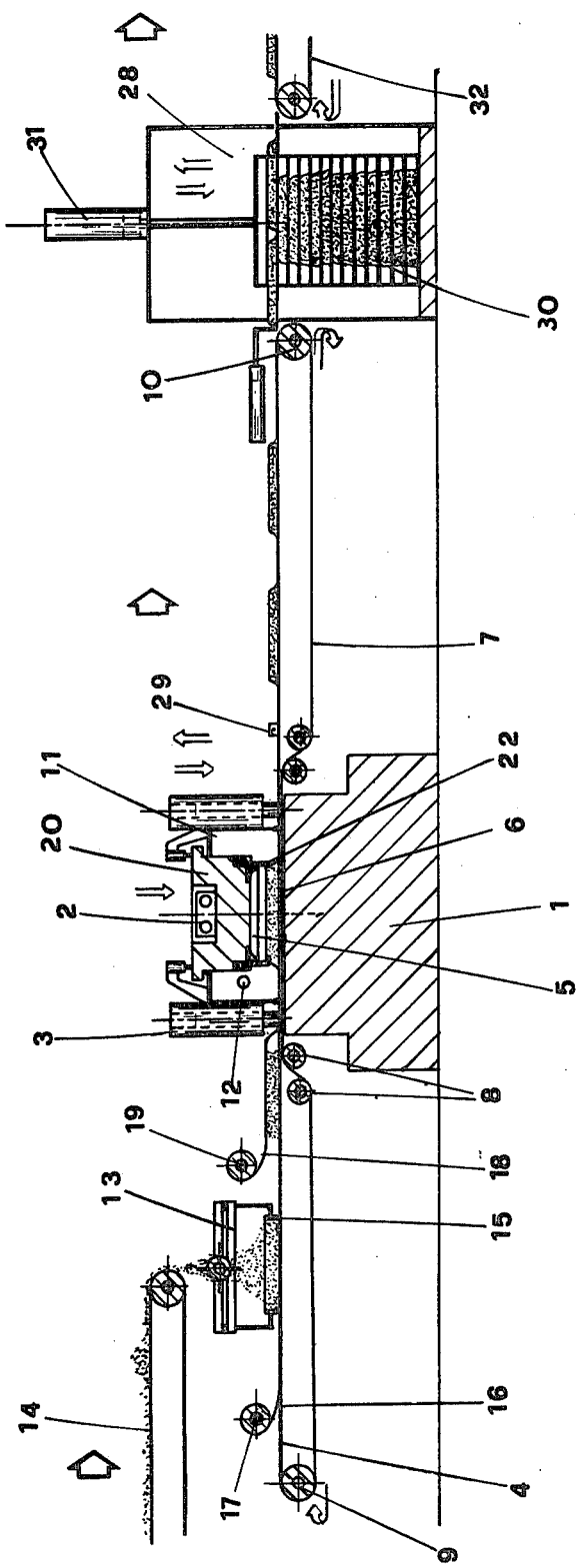
FIG. 1 shows a diagrammatic elevation view, in section along the line I—I in FIG. 2 of the apparatus, a description of which will give a better idea of the characteristics of the method according to the invention.
Figure 2:
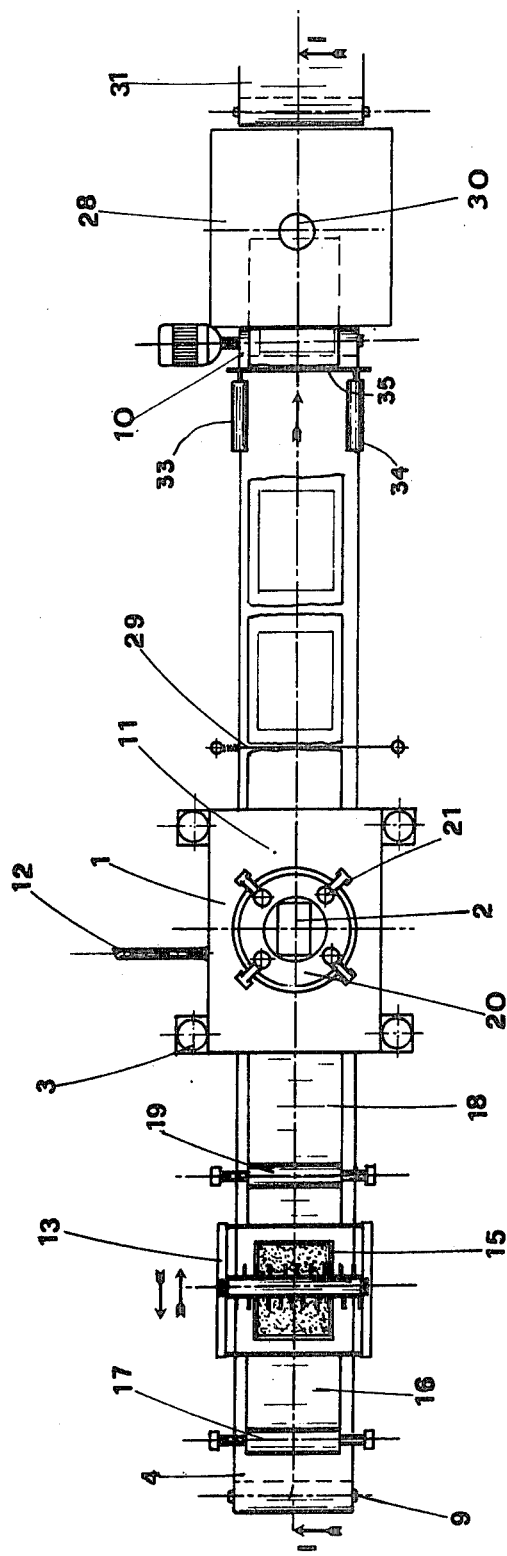
FIG. 2 shows an overall view from above of the same.

In this press, vibrator 2 is positioned at the top, suitably supported by side columns 3, while a conveyor belt 4, on which the mix of material for pressing moves forward, passes in the space between the bottom plate 5 of the press and the surface of the bedplate 6 thereof.

The return section 7 of the conveyor belt also passes through this interspace, thus forming a continuous endless belt kept taut by return rollers 8 and end rollers 9 and 10, at least one of which is motor-driven.

The bell-jar 11 provides the necessary container between the top of the press 1 and the conveyor belt 4 for the vacuum produced in it by suction through tube 12.

At the beginning of conveyor belt 4 there is the distributor device 13 by means of which the mix coming from conveyor belt 14 is evenly distributed within a boundary delimited by the frame 15 of the distributor itself, on the cardboard belt 16 coming from spool 17, previously stretched on the conveyor belt 4.

A second cardboard belt 18 coming from spool 19 is superimposed on the mix deposited on cardboard belt 16, to be transported by conveyor belt 4 under press 1.

The latter includes the head 20, on which vibrator 2 is fixed, which head is driven downwards by hydraulic cylinders 21 (FIG. 3) to compress the mix between the two sheets of cardboard 16 and 18, and is equipped on the perimeter with a containing device, consisting of mobile frame 22, equipped with thrust springs 23, while the fixed frame 24 of head 5 delimits the exact shape of the slab to be formed.

The compressive action is also facilitated by the vacuum formed inside bell-jar 11, which is lowered by hydraulic cylinders 25, positioned between the side columns 3.

Packings 26 and 27 ensure that the vacuum is maintained inside the bell-jar when this is lowered on to conveyor belt 4.

The two cardboard belts containing the mix are then sent, by means of conveyor belt 4 and pusher element means 33, 34 and 35, to drying oven 28, after cutting cardboard sheets 16 and 18 at the outlet of press 1 by means of cutting device 29, e.g. with a cutting wire.

Oven 28, shown diagrammatically in detail by way of example in FIG. 4, consists of a series of heating plates 30, which heat the slabs below while supporting the slabs above.

The complex formed by said panels is moved vertically by hydraulic piston 31 so as to allow entry of a further slab for heating, while the slab whose polymerisation is finished is ejected on to a conveyor belt 32, which carries it to the ensuing processes.

The purpose of heating the slabs in the oven is to speed up polymerisation of the resin contained in the mix, which in this way can be carried out in a time compatible with production requirements.

Obviously the slabs are still at this stage contained between the two sheets of cardboard, which are removed in the ensuing processes.

It is also specified that the belt moves forward at regular time intervals, during which the various operations of distribution of the mix, pressing, cutting the cardboard belts and insertion into the drying oven are carried out.

Obviously the detailed constructional pecularities of the apparatus described may assume different forms and appearances, within the essential characteristics of the invention, without thereby departing from the scope of the patent.

What I claim is:

1. An apparatus for the production of resin bonded grit slabs, which comprises means for mixing grit and resin in a predetermined ratio of grit to resin to form a mix, dispensing means for dispensing the mix, conveying means for the mix, means for stretching a first cardboard sheet on said conveying means, said dispensing means depositing said mix onto said first cardboard sheet, means for superimposing a second cardboard sheet on the mix deposited on said first cardboard sheet, whereby the mix is shaped into a slab, a press for compressing the slab, said conveying means conveying said slab into said press, means for maintaining a vacuum and for vibrating said slab in said press, cutting means for cutting the first and second cardboard sheets, oven means for heating the slab, said conveying means conveying said slab successively from said press to said means for cutting the first and second cardboard sheets, then to said oven means.

2. The apparatus according to claim 1 wherein said press has a bottom plate and a bed plate, said conveying means conveys the mix in the interspace between said bottom plate and said bed plate.

3. The apparatus according to claim 2 wherein said conveying means is a belt and the return section of said belt passes through said interspace.

4. The apparatus according to claim 1 wherein said means for maintaining a vacuum in said press is a bell-jar.

5. The apparatus according to claim 1 wherein said oven means comprises a plurality of heating plates.

6. The apparatus according to claim 1 wherein said conveying means is a conveyor belt which moves at regular time intervals.

* * * * *